United States Patent
Sennett et al.

(10) Patent No.: US 8,489,084 B2
(45) Date of Patent: Jul. 16, 2013

(54) OVER THE AIR PROGRAMMING VIA CELLULAR BROADCAST

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1266 days.

(21) Appl. No.: 12/059,140

(22) Filed: Mar. 31, 2008

(65) Prior Publication Data

US 2009/0247138 A1 Oct. 1, 2009

(51) Int. Cl.
*H04M 3/00* (2006.01)

(52) U.S. Cl.
USPC ........... 455/419; 455/560; 370/252; 370/350; 370/349

(58) Field of Classification Search
USPC .................. 455/419, 343, 560; 370/252, 350, 370/349
See application file for complete search history.

(56) References Cited

U.S. PATENT DOCUMENTS

| | | | |
|---|---|---|---|
| 6,112,075 A | 8/2000 | Weiser | 455/404 |
| 2003/0211846 A1* | 11/2003 | Nagpal et al. | 455/434 |
| 2005/0047388 A1* | 3/2005 | Takabatake et al. | 370/349 |
| 2006/0040639 A1 | 2/2006 | Karl et al. | 455/404.1 |
| 2007/0049344 A1* | 3/2007 | Van Der Velde et al. | 455/560 |
| 2009/0154446 A1* | 6/2009 | Adler et al. | 370/350 |
| 2009/0268619 A1* | 10/2009 | Dain et al. | 370/252 |

* cited by examiner

*Primary Examiner* — Manpreet Matharu
(74) *Attorney, Agent, or Firm* — Woodcock Washburn LLP

(57) ABSTRACT

In a communications system, one or more mobile devices may be programmed through the use of an assigned channel of a logical channel. For example, a broadcast control channel (BCCH) transmission may be received by one or more mobile devices, the transmission comprising a set of instructions to program the mobile devices. The BCCH transmission may be used to program certain mobile devices, such as a type or brand of device, or mobile devices having certain features, such as call waiting. The mobile device may be configured to accept a transmission, such as a packet in a GPRS network, on one channel while rejecting a transmission on other channels. Further, the mobile device may be reconfigured to accept additional channel transmissions or reject currently approved channel transmissions.

12 Claims, 8 Drawing Sheets

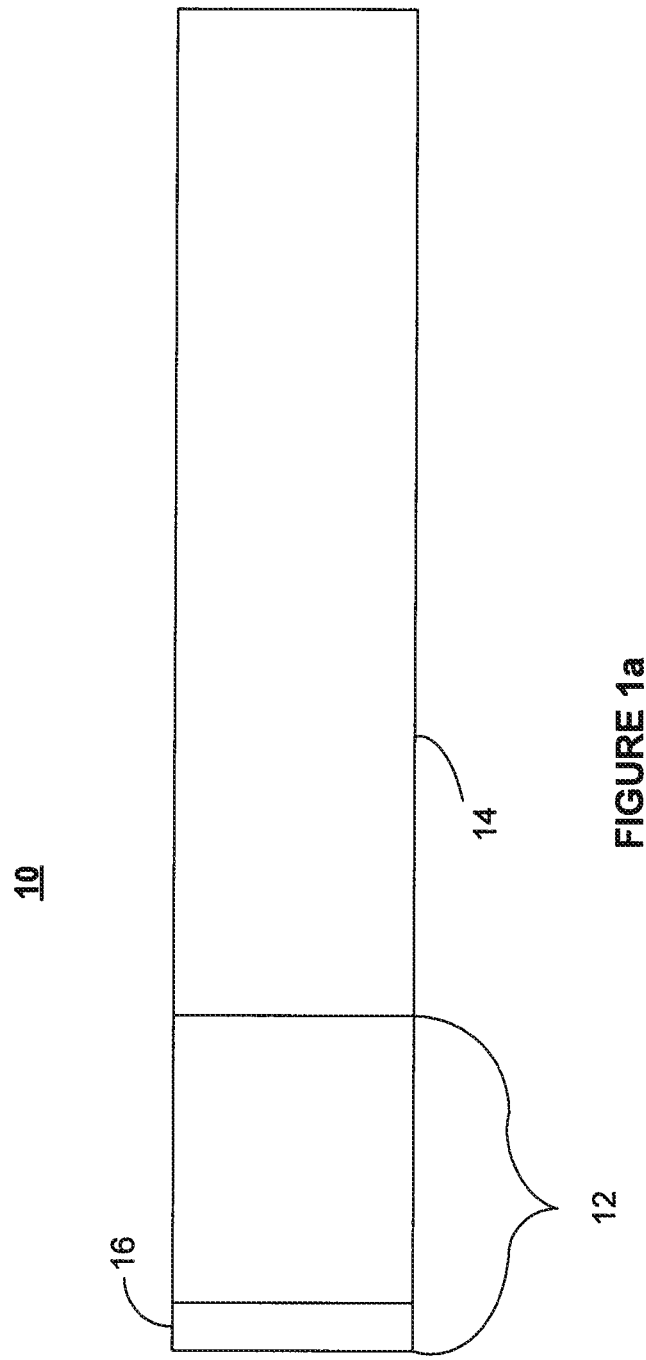

OVER THE AIR PROGRAMMING VIA CELLULAR BROADCAST

TECHNICAL FIELD

The technical field generally relates to communications systems, and more particularly, to programming a mobile device.

BACKGROUND

A mobile device may be programmed remotely. Information such as the phone number, logos to be displayed, subscriber identity module (SIM) personalization, rules of network use, roaming rules, and the like are downloaded to the mobile device. When information, such as the information described previously, for example, needs to be updated in the mobile device, the updates are typically downloaded to the mobile device through the use of over the air (OTA) programming.

SUMMARY

A mobile device may be configured using a specified channel of a logical control channel, such as a logical channel of the broadcast control channel ("BCCH") of a cellular network. A mobile device may be configured to answer BCCH message packets transmitted over one or more logical channels while rejecting BCCH message packets transmitted over other logical channels. A logical channel may be designated for various purposes. For example, a BCCH logical channel may be designated for programming mobile devices manufactured by a specific manufacturer. In another example, a BCCH logical channel may be designed for a specific feature, such as call waiting, and mobile devices associated with calling plans having that feature may be configured to accept a transmission for programming on that logical channel.

BRIEF DESCRIPTION OF THE DRAWINGS

The foregoing and other objects, aspects and advantages of the disclosed subject matter will be better understood from the following detailed description with reference to the drawings.

FIG. 1*a* is an exemplary BCCH message packet for programming a mobile device;

DETAILED DESCRIPTION OF ILLUSTRATIVE EMBODIMENTS

Figure 1:
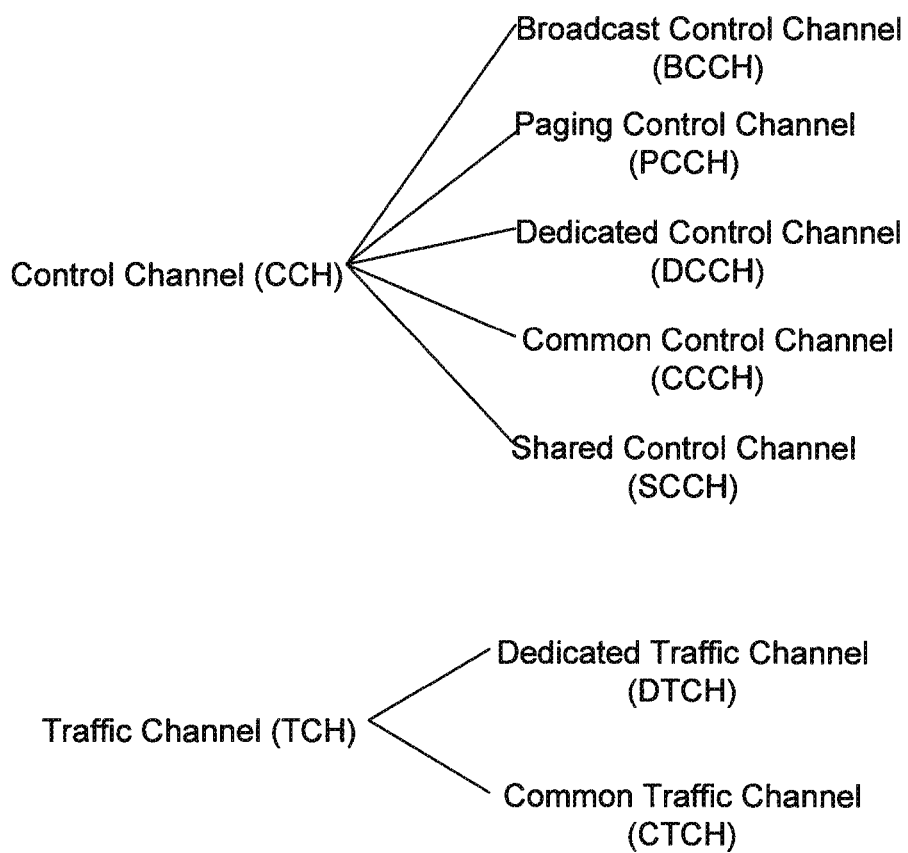
FIG. 1 is an illustration of exemplary channels used by a cellular network.

In a cellular radio network, such as the global system for mobile communication ("GSM"), there may be two main logical broadcast channels: a control channel ("CCH") and a traffic channel ("TCH"). The TCH is typically used for speech and data whereas the CCH is typically used for network management messages and channel maintenance tasks. Both the TCH and the CCH may be divided into logical sub-channels, such as the ones shown in FIG. 1.

The BCCH, a downlink point-to-multipoint logical channel, is used by various cellular radio networks, including GSM, to broadcast various control signals. The BCCH typically broadcasts continually on the downlink information such as base station identity, frequency allocations, and frequency-hopping sequences. A message transmitted over the BCCH may vary according to the particular transmission protocols used by the cellular network. FIG. 1*a* is an exemplary message packet data structure that may be used to implement the present subject matter.

As shown, message packet 10, which may be a software update for a mobile device, has header portion 12 and data portion 14. If a cellular network is transmitting continuously over the BCCH, message packet 10 may be one of multiple packets transmitted over a period of time. A typical BCCH has multiple logical channels available for use. The specific channel of the BCCH used is identified in header portion 12 of message packet 10.

Header portion 12 may also contain certain information that identifies the packet as well as identifies the information contained in data portion 14, including the byte size and type of information contained in data portion 14. Typically, data portion 14 contains the software code that may be received and stored in a memory of a mobile device, such as volatile memory 66 and non-volatile memory 68 of processor 58 shown in FIG. 3. Processor 58 of FIG. 3 may be used by mobile subscriber 775 of FIG. 5.

Information in header portion 12 of message packet 10 may be used to implement the present subject matter. For example, header portion 12 may have a message identification portion 16 specifying a particular logical channel of the BCCH. A processor of a mobile device, such as processor 58 of FIG. 3, may be configured to accept message packet 10 if message packet 10 has a particular message identification portion 16 associated with the particular channel. Alternatively, a processor of a mobile device may be configured to accept message packet 10 if message packet 10 has a particular header portion 12, which may include a particular combination of identification portion 16 and one or more other portions of header portion 12.

Message identification portion 16 may be configured to use a specific channel of BCCH when it is desired to program certain mobile devices. For example, a BCCH logical channel may be associated with programming for a specific manufacturer or vendor of a mobile device. In another example, a BCCH logical channel may be used to program mobile devices configured to handle a certain calling feature, such as call waiting. In another example, a BCCH logical channel may be configured to program a certain group of users, such as the police or firemen. A BCCH logical channel may be assigned permanently or may vary over time. Additionally, a BCCH logical channel may be used to program a mobile device to accept additional BCCH logical channel message packets or to reject certain BCCH logical channels currently accepted.

Figure 2A:
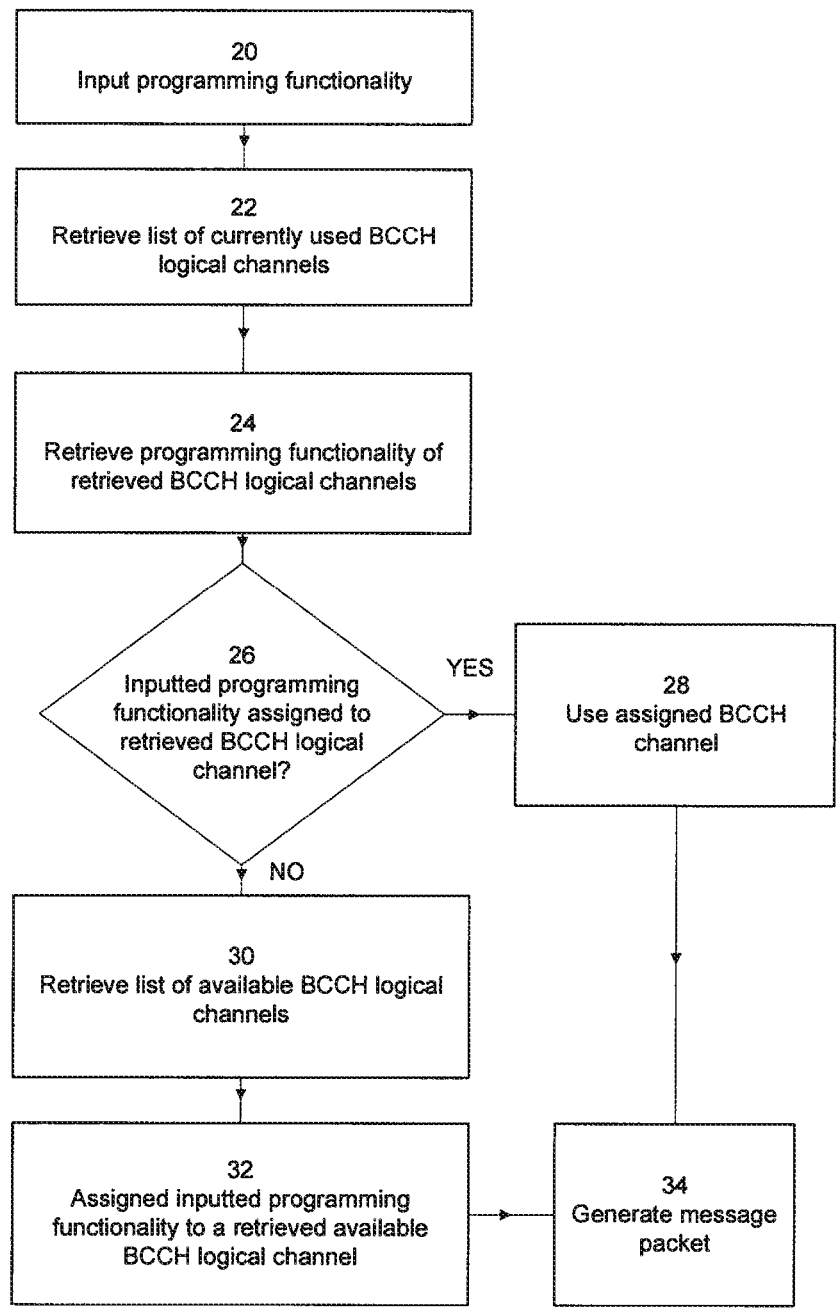
FIG. 2*a* is an exemplary flow diagram for generating a BCCH message packet.
Figure 3:
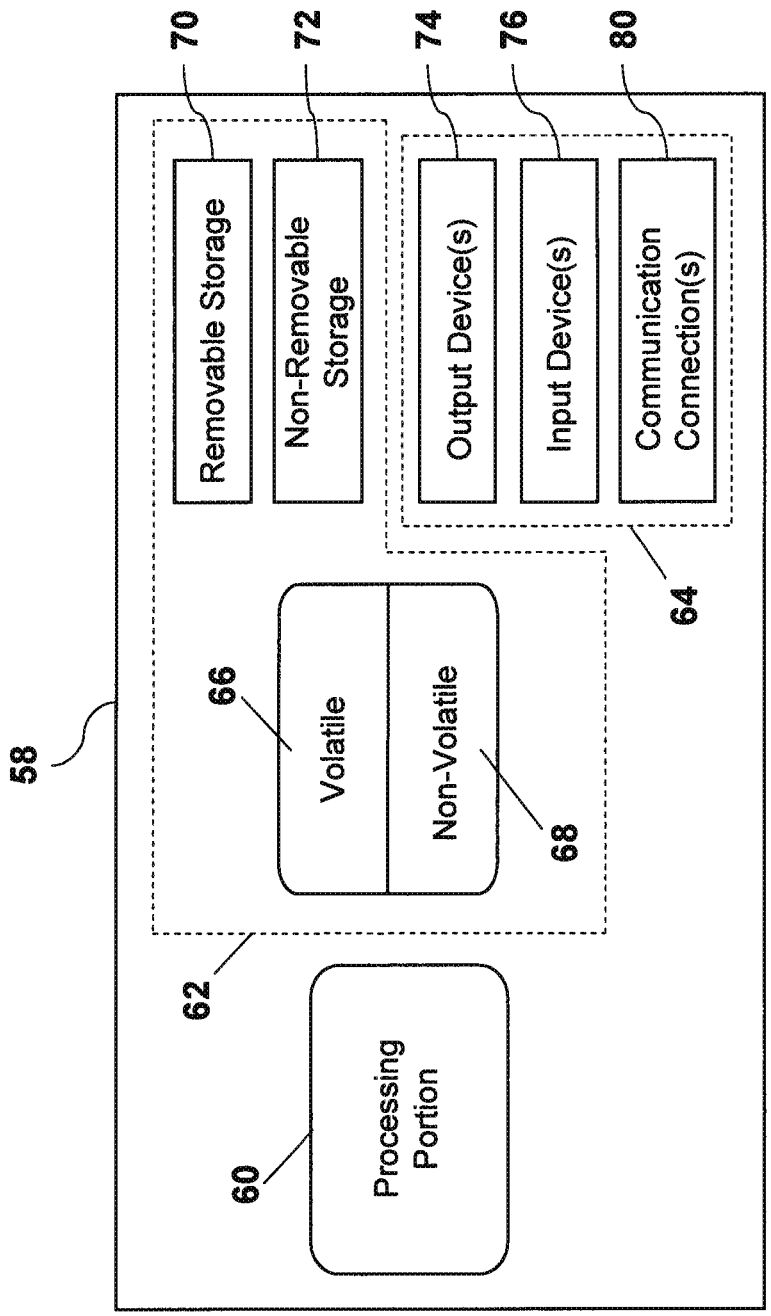
FIG. 3 is an exemplary illustration of a processor that may be used in a mobile device according to the present subject matter.

FIG. 2a is an exemplary method for generating a message packet, such as message packet 10 of FIG. 1a, used to program a processor of a mobile device, such as processor 58 of FIG. 3, over the air. Before the message packet is generated, the particular channel assignment for the programming to be performed is determined. For example, a cellular network provider may want to reprogram all cellular phones with text messaging capabilities. One or more BCCH channels may be assigned to facilitate programming for that functionality. The programming functionality is inputted 20 and a list of currently used BCCH logical channels is returned 22.

The programming functionality of the currently used BCCH logical channels is retrieved 24. If the inputted programming functionality is assigned to a retrieved, currently used BCCH logical channel 26, the previously assigned BCCH logical channel is used 28 and the message packet is generated 34 using the BCCH logical channel. It should be noted that one or more BCCH logical channels may be assigned to certain functionality for a specific use and that multiple functionalities or uses may be assigned to a single BCCH logical channel. For example, if a mobile device has two functions, such as function "1" and function "2", that interact or are associated with each other in a certain way that, when programming function "1", programming of function "2" invariable occurs, the same BCCH logical channel may be used for both functions.

If the inputted programming functionality is not assigned to a retrieved, currently used BCCH logical channel 26, a list of BCCH logical channels available for assignment are retrieved 30. One or more of the available BCCH logical channels are assigned 32 for use to implement the programming for the inputted functionality and the message packet is generated 34 using the one or more BCCH logical channels. The logical channel may be assigned according to various criteria. For example, the logical channel may be pre-selected. For example, a particular mobile device, or a type of mobile device, may have one channel pre-selected while a different mobile device, or type of mobile device, may have a different channel pre-selected. In another example, the channel may be pre-selected based upon the type of service which the programming will affect.

Figure 2B:
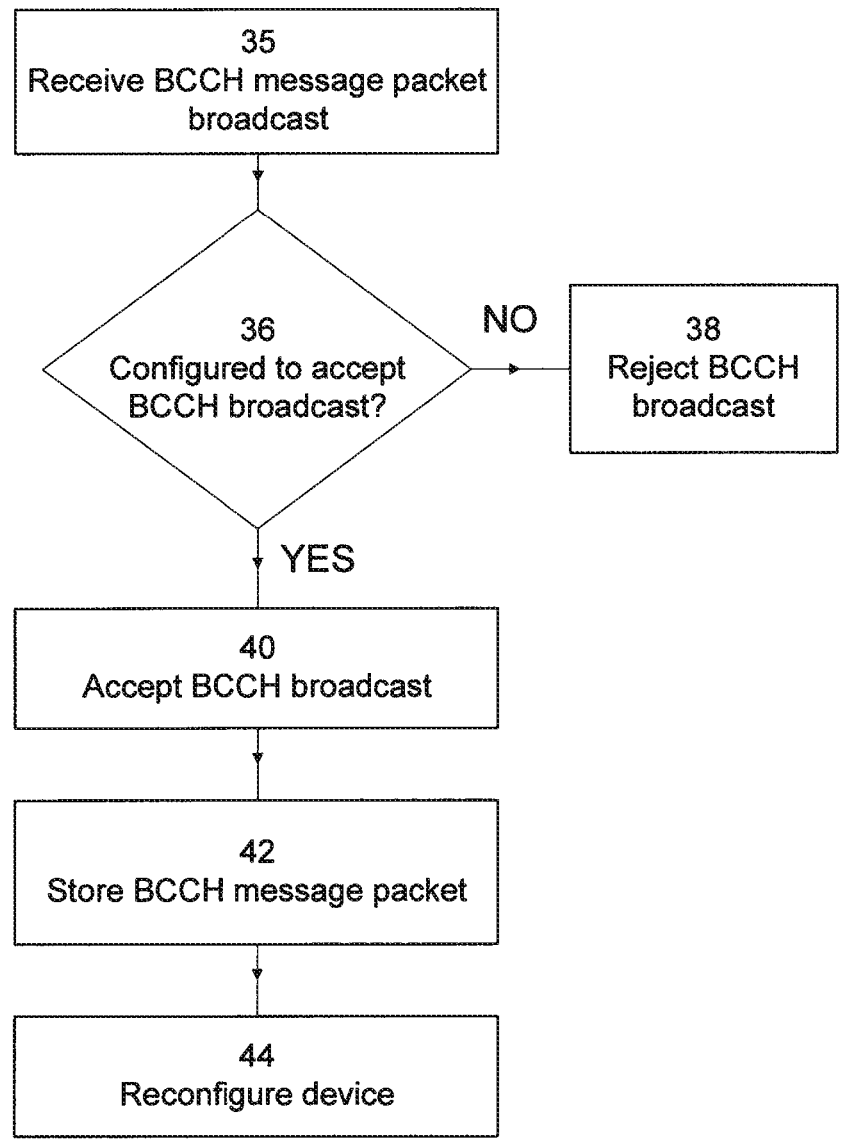
FIG. 2*b* is an exemplary flow diagram for configuring a mobile device.

When a mobile device receives a BCCH logical channel signal, the configuration of the mobile station determines whether or not the programming contained in a message packet transmitted over that BCCH logical channel is to be accepted. FIG. 2b is an exemplary method in which a processor, such as processor 58 of FIG. 3, of a mobile device, such as mobile subscriber 755 of FIG. 5, may be programmed using the present subject matter. The mobile device receives 35 a BCCH message packet broadcast. The BCCH broadcast may be transmitted with header information indicating a specific channel of use. For the following description of FIG. 2b, an example BCCH logical channel may be channel "1", though it should be appreciated that more than one BCCH logical channel may be used and that the BCCH logical channel may be assigned or designated in a manner other than a numerical designation.

A determination 36 is made as to whether or not a mobile device is configured to accept the BCCH broadcast. The determination may be made by determining which channels the mobile device is configured to accept. The acceptable channels may be stored for access in the mobile device memory, such as non-volatile memory 68 of FIG. 3. For example, a mobile device may be configured to only accept BCCH broadcast of logical channel "1". If the mobile device is not configured to accept BCCH logical channel "1", the BCCH broadcast may be rejected 38.

If the mobile device is configured to accept the BCCH broadcast, for example, BCCH logical channel "1", the mobile device accepts 40 the BCCH broadcast and stores 42 at least a portion of the information in the BCCH broadcast, for example in non-volatile memory 68 of FIG. 3. The BCCH message packet is accessed by the mobile device and the device is reconfigured 44 according to the message packet contents.

It should be noted that one or more steps of FIG. 2a or 2b may be omitted and will still be within the scope of the presently disclosed subject matter. For example, on FIG. 2a, a list may not be returned 22 or the programming functionality may not be retrieved.

FIG. 3 is a block diagram of an example processor 58 for implementing the present subject matter. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications therebetween. The input/output portion 64 is capable of providing and/or receiving components utilized to implement the present subject matter, as described above. For example, the input/output portion 64 is capable of providing/receiving message packets transmitted over a BCCH logical channel. The processing portion 60 is capable of determining if the message packet is to be accepted, retrieving the message packet if stored, and to configure the mobile device according to the contents of the message packet, or a combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with providing the present subject matter. For example, as described above, the memory portion is capable of storing a message packet. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 80 that allow the processor 58 to communicate with other devices. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included.

The following description sets forth some exemplary telephony radio networks and non-limiting operating environments in which the present subject matter may be provided. The below-described operating environments should be considered non-exhaustive, however, and thus the below-described network architectures merely show how the present subject matter can be incorporated into existing network structures and architectures. It can be appreciated, however, that the present subject matter can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to various services, such as Universal Mobile Telephone System ("UMTS"), Frequency Division Duplexing ("FDD") and Time Division Duplexing ("TDD"), High Speed Packet Data Access ("HSPDA"), cdma2000 1× Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the present subject matter can be applied independently of the method for data transport, and do not depend on any particular network architecture, or underlying protocols.

Figure 4:
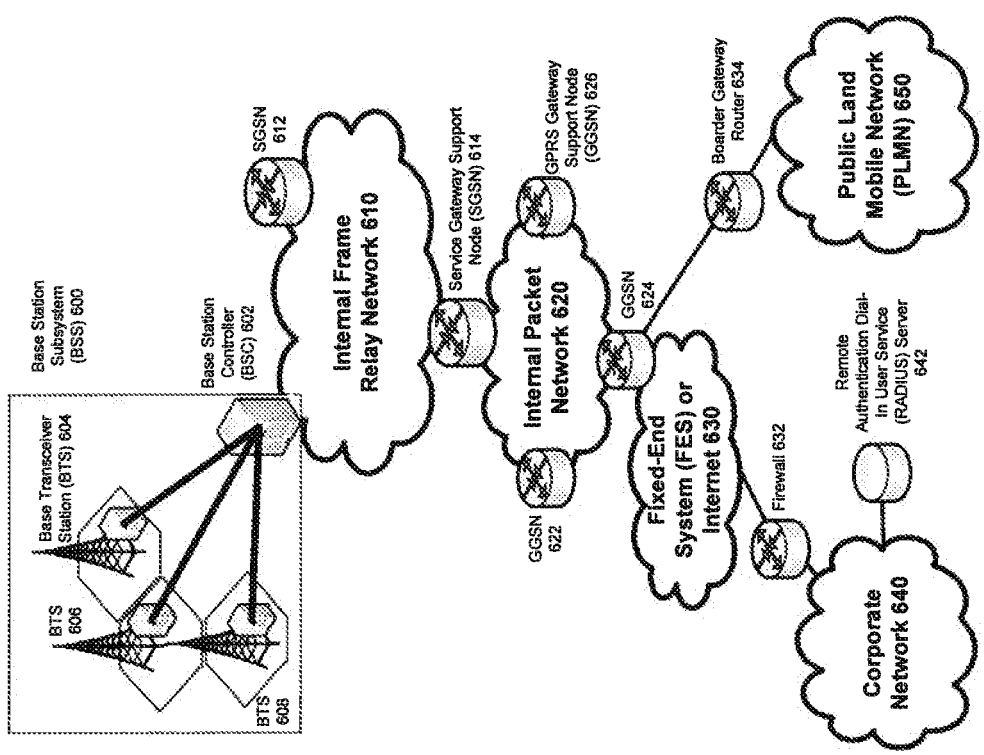
FIG. 4 depicts an overall block diagram of an exemplary packet-based mobile cellular network environment, such as a GPRS network, in which the present subject matter may be implemented.

FIG. 4 depicts an overall block diagram of an exemplary packet-based mobile cellular network environment, such as a GPRS network, in which the present subject matter may be provided. In an example configuration, the cellular radio network 34 and towers 36 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
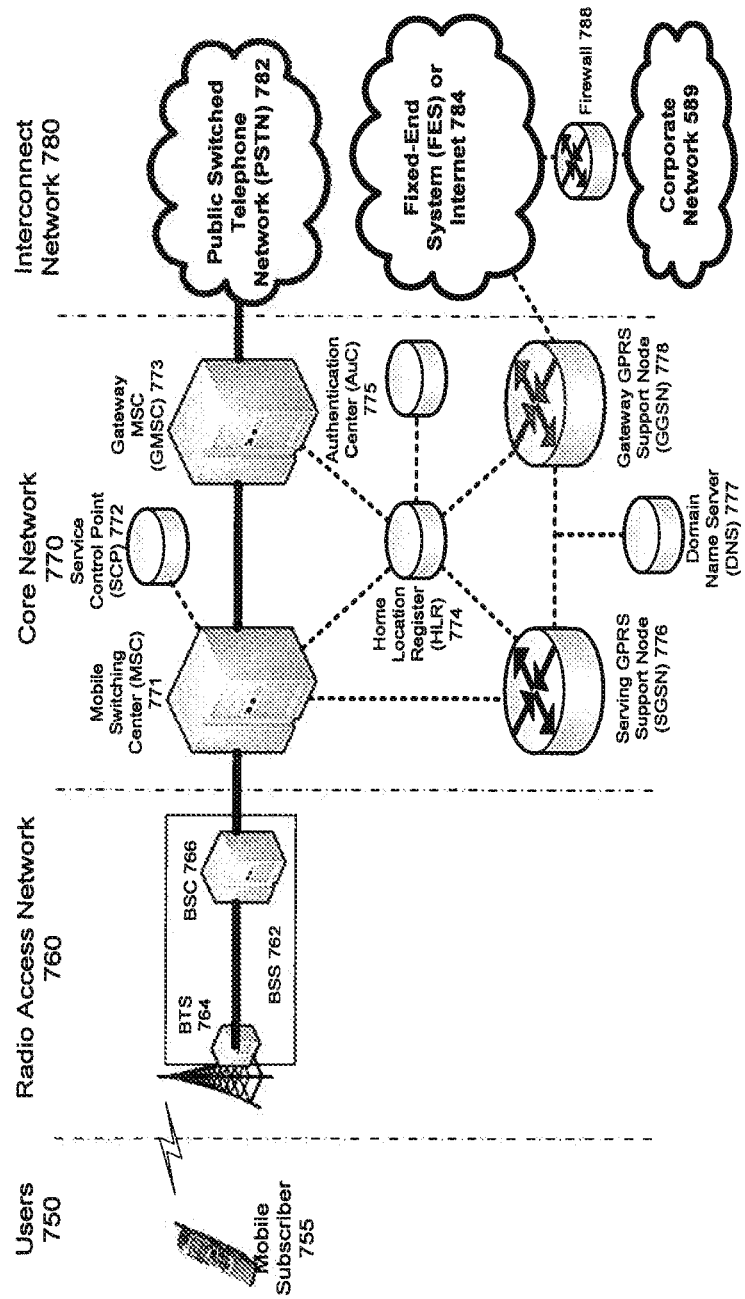
FIG. 5 illustrates an architecture of a typical GPRS network in which the present subject matter may be implemented.

FIG. 5 illustrates an exemplary architecture of a typical GPRS network as segmented into four groups: users 750, radio access network 760, core network 770, and interconnect network 780. In an example configuration one or more computing networks configured to implement the present subject matter are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises a mobile device. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of the present subject matter can include but are not limited to Gateway GPRS Support Node tables, Fixed End System router tables, firewall systems, VPN tunnels, and any number of other network elements as required by the particular digital network.

It should be noted that mobile subscriber 755 may be representative of any appropriate type of device that can receive BCCH message packets. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Figure 6:
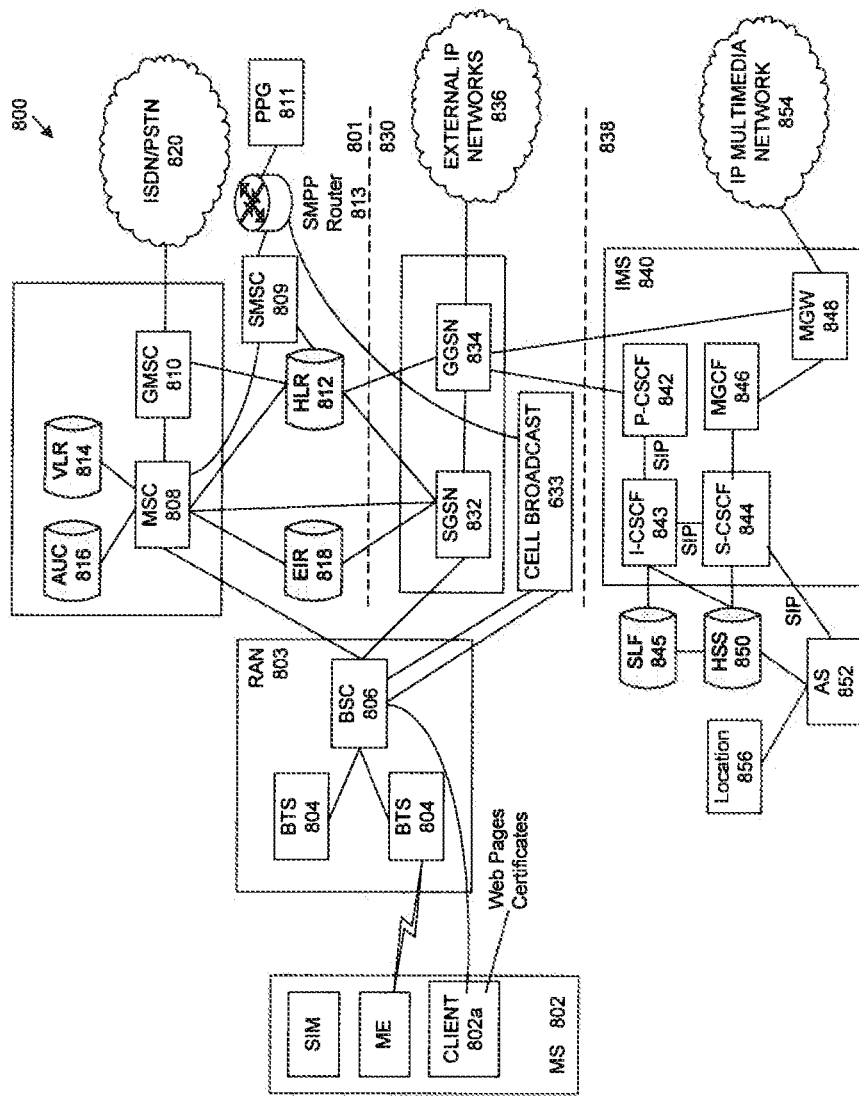
FIG. 6 illustrates an example alternate block diagram of an exemplary GSM/GPRS/IP multimedia network architecture in which the present subject matter may be implemented.

FIG. 6 illustrates another exemplary block diagram view of a GSM/GPRS/IP multimedia network architecture 800 in which the present subject matter can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of the present subject matter have been described in connection with various computing devices, the underlying concepts can be applied to any computing device or system capable of implementing the present subject matter. The various techniques described herein can be implemented in connection with hardware or software or, where appropriate, with a combination of both. Thus, implementing the present subject matter can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the disclosed subject matter. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for the present subject matter also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing the present subject matter. When implemented on a general-purpose processor, the program code combines with the processor to provide a unique apparatus that operates to invoke the functionality of the present subject matter. Additionally, any storage techniques used in connection with the present subject matter can invariably be a combination of hardware and software.

While the present subject matter has been described in connection with the various embodiments of the various figures, it is to be understood that other similar embodiments can be used or modifications and additions can be made to the described embodiment for performing the same function of the present subject matter without deviating therefrom. For example, one skilled in the art will recognize that a system for implementing the present subject matter as described may apply to any environment, whether wired or wireless, and may be applied to any number of devices connected via a communications network and interacting across the network. Therefore, the present subject matter should not be limited to any single embodiment, but rather should be construed in breadth and scope in accordance with the appended claims.

What is claimed is:

1. A method comprising:
   generating a message packet comprising:
      a header portion configured to identify a logical channel of a broadcast control channel of a cellular network; and
      a data portion comprising at least one instruction to configure a mobile device;
   transmitting the message packet over the broadcast control channel, wherein an intended recipient of the transmitted message packet is a mobile device configured to:
      receive the message packet over the broadcast control channel;
      determine if the mobile device is configured to accept a message packet on the logical channel of the broadcast control channel over which the message packet is received; and
      accept the message packet if the mobile device is configured to accept the message packet received over the logical channel.

2. The method of claim 1, wherein:
   the header portion comprises a message identification portion; and
   the message identification portion is configured to specify the logical channel of the broadcast control channel the message packet is being transmitted over.

3. The method of claim 1, wherein the mobile device is further configured to reject the message packet if the mobile device is not configured to accept the message packet transmitted over the logical channel.

4. The method of claim 1, further comprising reconfiguring the mobile device if the mobile device is configured to accept the message packet.

5. A mobile device comprising:
   a processor; and
   memory coupled to the processor, the memory having stored thereon executable instructions that when executed by the processor cause the processor to effectuate operations comprising:
      receiving a message packet comprising:
         a header portion configured to identify a logical channel of a broadcast control channel of a cellular network; and a data portion comprising a set of instructions to configure the mobile device;
determining if the mobile device is configured to accept a message packet over the logical channel;
accepting the message packet if the mobile device is configured to accept the message packet over the logical channel;
reject the message packet if the mobile device is not configured to accept the message packet over the logical channel;
reconfigure the mobile device according to the set of instructions in the data portion if the mobile device is configured to accept the message packet; and
storing a list of logical channels for transmissions of which the mobile device is configured to accept.

6. The mobile device of claim 5, wherein the header portion comprises a message identification portion, wherein the message identification portion is configured to specify the logical channel of the broadcast channel.

7. A system comprising:
a processor; and
memory coupled to the processor, the memory having stored thereon executable instructions that when executed by the processor cause the processor to effectuate operations comprising:
generating a message packet comprising:
a header portion configured to identify a logical channel of a broadcast control channel of a cellular network; and
a data portion comprising a set of instructions to configure a mobile device;
storing the memory packet;
storing a list of logical channels of the broadcast control channel;
storing an assignment of a function to at least one of the list of logical channels; and
transmitting the message packet over the at least one of the list of logical channels of the broadcast control channel assigned to the function wherein an intended recipient of the transmitted message packet is a mobile device configured to:
receive the message packet over the broadcast control channel;
determine if the mobile device is configured to accept a message packet on the logical channel of the broadcast control channel over which the message packet is received; and
accept the message packet if the mobile device is configured to accept the message packet received over the logical channel.

8. The system of claim 7, wherein:
the header portion comprises a message identification portion; and
the message identification portion is configured to specify the logical channel of the broadcast control channel.

9. A computer-readable storage medium, the computer-readable storage medium not being a transient signal, the computer-readable storage medium having stored thereon executable instructions that when executed by a processor cause the processor to effectuate operations comprising:
generating a message packet comprising:
a header portion configured to identify a logical channel of a broadcast control channel of a cellular network; and
a data portion comprising a set of instructions to configure to the mobile device;
transmitting the message packet over a broadcast control channel of the cellular network, wherein an intended recipient of the transmitted message packet is a mobile device configured to:
receive the message packet over the broadcast control channel;
determine if the mobile device is configured to accept a message packet on the logical channel of the broadcast control channel over which the message packet is received; and
accept the message packet if the mobile device is configured to accept the message packet received via the logical channel.

10. The computer-readable storage medium of claim 9, wherein:
the header portion comprises a message identification portion; and
the message identification portion is configured to specify the logical channel of the broadcast control channel.

11. A computer-readable storage medium, the computer-readable storage medium not being a transient signal, the computer-readable storage medium having stored thereon executable instructions that when executed by a processor cause the processer to effectuate operations comprising:
receiving a message packet comprising:
a header portion configured to identify a logical channel of a broadcast control channel of a cellular network; and
a data portion comprising a set of instructions to configure to a mobile device;
determining if the mobile device is configured to accept a message packet over the logical channel of the broadcast control channel;
accepting the message packet if the mobile device is configured to accept the message packet over the logical channel; and
reconfiguring the mobile device according to the set of instructions in the data portion;
storing the message packet; and
storing a list of logical channels for transmissions of which the mobile device is configured to accept.

12. The computer-readable storage medium of claim 11, wherein:
the header portion comprises a message identification portion; and
the message identification portion is configured to specify the logical channel of the broadcast control channel.

* * * * *